United States Patent [19]

Quercy

[11] Patent Number: 4,494,792
[45] Date of Patent: Jan. 22, 1985

[54] TRANSFORMABLE SEAT
[75] Inventor: Alexandre Quercy, Boulogne, France
[73] Assignee: Societe Anonyme Des Usines Chausson, Asnieres, France
[21] Appl. No.: 287,053
[22] Filed: Jul. 27, 1981
[30] Foreign Application Priority Data
Jul. 31, 1980 [FR] France ................................ 80 16949
[51] Int. Cl.³ .............................................. A47C 13/00
[52] U.S. Cl. ........................................ 297/63; 297/64; 297/358
[58] Field of Search ........................ 297/63, 64, 66, 67, 297/354, 355, 377, 304, 305, 84, 85, 353; 296/63, 64, 69; 5/37 R, 433, DIG. 1

[56] References Cited
U.S. PATENT DOCUMENTS

| 224,489 | 2/1880 | Starr | 297/358 |
|---|---|---|---|
| 506,200 | 10/1893 | Archer | 297/358 X |
| 1,926,259 | 9/1933 | Bitzenburger | 297/305 |
| 2,278,890 | 4/1942 | May | 297/358 X |
| 2,714,922 | 8/1955 | McKibbon et al. | 297/83 |
| 3,070,402 | 12/1962 | Stanton | 5/DIG. 2 |
| 4,339,149 | 7/1982 | Nakao et al. | 297/377 |
| 4,343,508 | 8/1982 | Heling et al. | 296/69 X |
| 4,353,594 | 10/1982 | Lowe | 297/355 X |

FOREIGN PATENT DOCUMENTS 515958 8/1955 Canada ................................ 297/64

Primary Examiner—James T. McCall
Attorney, Agent, or Firm—Browdy and Neimark

[57] ABSTRACT

A seat, which is transformable into a berth for a vehicle comprises a horizontal seat member and a seat back connected to the support of the seat member by an articulated linkage. The linkage maintains the lower portion of the seat back in permanent contact with the rear portion of the horizontal seat member during the pivoting movement of the seat back, from an upstanding position to a position in which the surface of the seat and member of the seat back are in alignment.

10 Claims, 5 Drawing Figures

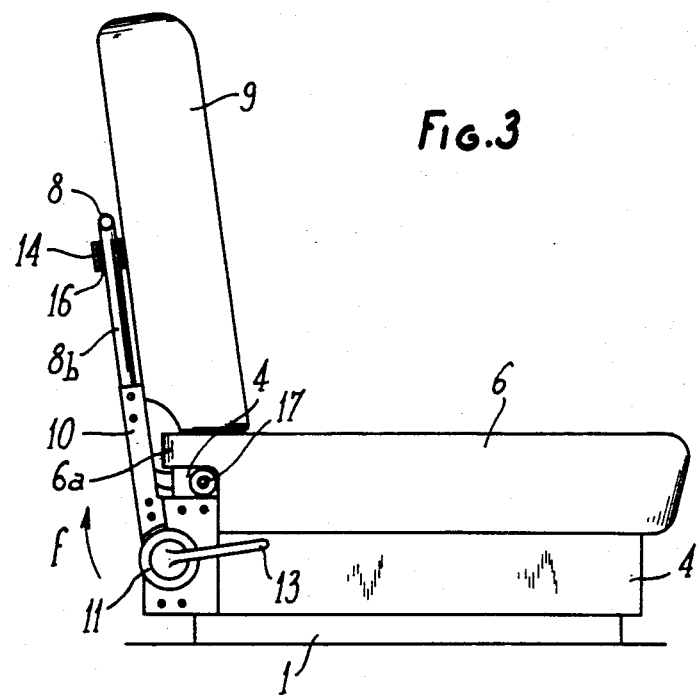
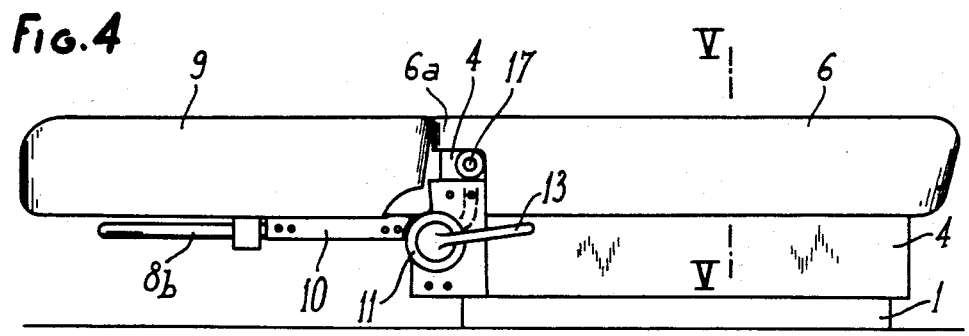
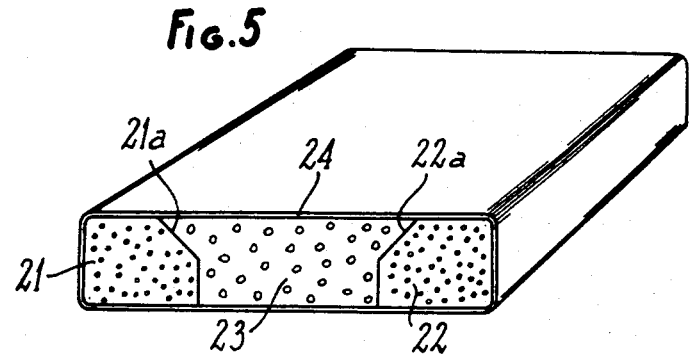

4,494,792

TRANSFORMABLE SEAT

FIELD OF THE INVENTION

The present invention relates to a novel transformable seat, which can be used in many applications but presents quite particular advantages when used in vehicles where the seat has to be transformable to form a comfortable berth.

BACKGROUND OF THE INVENTION

Hitherto, many vehicles, particularly land vehicles, have been provided with seats convertible into berths but exhibiting several disadvantages; first of all, almost in all cases, there exists an open space between the seat back and the seat itself when the seat is in position for forming a berth.

The seat as well as its back have, usually, a transverse contour provided for supporting the user sideways when the vehicle is moving, but this contour makes the seat quite uncomfortable when used as a berth.

This disadvantage is all the greater when the seat, positioned as a berth, is used in its transverse direction, as is the case in some leisure vehicles, particularly in camping vehicles, where it is expected to use the front seat, in combination with intermediate cushions, for forming a berth the longitudinal direction of which is perpendicular to the vehicle longitudinal axis.

SUMMARY OF THE INVENTION

The invention provides a solution to the hereabove stated problems and remedies the above mentioned disadvantages.

According to the invention, the transformable seat comprising a horizontal seat member and a back is characterized in that the back is connected to the support of the seat member by an articulation linkage. This linkage maintains the lower portion of the back is permanent contact with the top of the rear portion of the seat member and the rear end of the latter, during the pivoting movement of the back, from an upstanding position to a position in which the surface is in alignment with the top of the seat member.

BRIEF DESCRIPTION OF THE DRAWINGS

Various other characteristic features of the invention will become apparent from the following detailed description.

Embodiments of the object of the invention are shown, by way of non-limiting examples, in the accompanying drawings.

FIG. 3 is a view similar to FIG. 1, the seat being turned 180° relative to said last Figure.

FIG. 4 is an elevation view similar to FIG. 3, illustrating a characteristic position of the seat.

FIG. 5 is a sectional perspective view showing a development of the invention.

Figure 1:
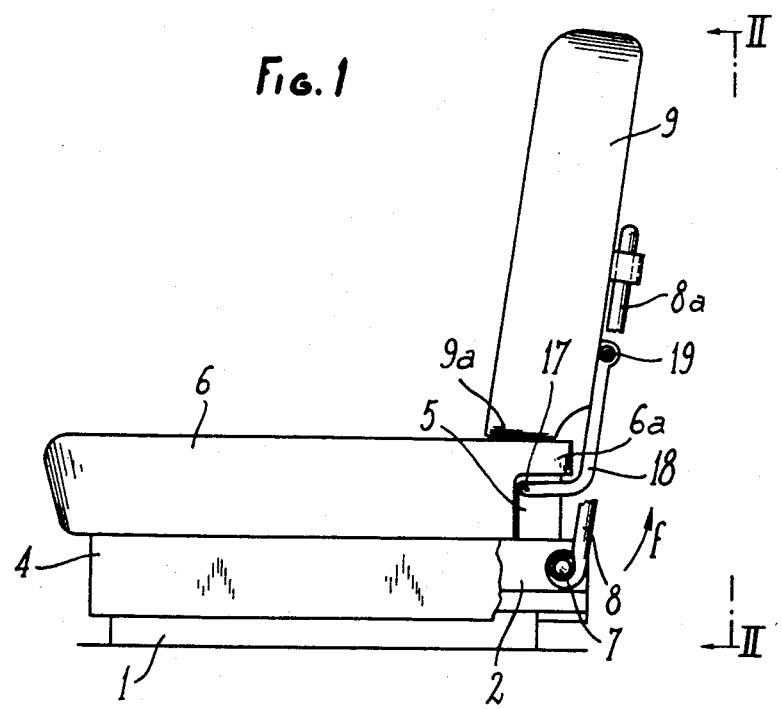
FIG. 1 is a schematic side elevation view, partly cut out, of a seat embodying the invention.

The drawing illustrates the seat of the invention which is transformable into a berth for a vehicle. It is obvious that the invention can be carried out in a similar way for other types of seats, particularly for furniture seats.

DESCRIPTION OF PREFERRED EMBODIMENTS

In the hereabove considered application, the seat is mounted on rails 1 in order to be moved forward or rearward. The support for the seat comprises two beams 2 and 3 adapted for being displaced relative to rails 1 and comprising blocking mechanisms which are not shown nor described in more detail since they can be of any known type and they are not directly part of the invention.

The beams 2 and 3 are connected to each other by a box element 4 while there is provided a protruding rear beam 5. The box element is used as a support for a seat 6 conveniently padded which forms in its rear portion a projection 6a over a cross-beam 5. The beam 2 supports through an articulation axis 7 the leg 8a of a stirrup 8, the leg 8b of which is fixed to a crank 10 of a return unit 11. The return 11 can be of any type known in the seat technique and it comprises a return member, particularly a helical spring 12, which tends continuously to pivot the crank 10 in the direction shown by arrow f in the drawing. The return unit 11 can be operated by a lever 13 which allows securing the crank against motion in various angular positions. The stirrup 8 is kept applied against the rear wall of a seat back 9 by guide-pieces 14, 14a, for example formed by the end of a section 15 fixed to said seat back. It is advantageous that guide-pieces 14, 14a comprise against their portion which is in contact with legs 8a, 8b of stirrup 8, fittings 16 of a flexible antifriction material, for example that known under the name of Teflon.

The cross-beam 5 is used as support for articulations 17 of connecting rods 18 the other end of which is connected via articulations 19 carried by a bar 20 fixed to the rear face of the seat back 9.

As is shown in FIG. 1, the connecting rods 18 are bent so that their articulation is substantially in alignment with the median plane of the seat back 9. The length of the connecting rods 18 is on the other hand chosen so that the underneath 9a of the seat back 9 comes flush and bears against the top of the seat 6, and in particular of the projection 6a.

The disposition at the rear portion of the seat back of the stirrup 8 of the connecting rods and of the members connecting said stirrup and said connecting rods to the seat back provides an easy mounting and also allows masking the mechanical members by providing a covering not shown in the drawing.

It is evident that the stirrup could only comprise its legs 8a, 8b which could be engaged into sheaths of the seat back, and likewise the connecting rods 18 could be replaced by cranks fixed inside the thickness of the seat back or directly in the back of the latter.

Figure 2:
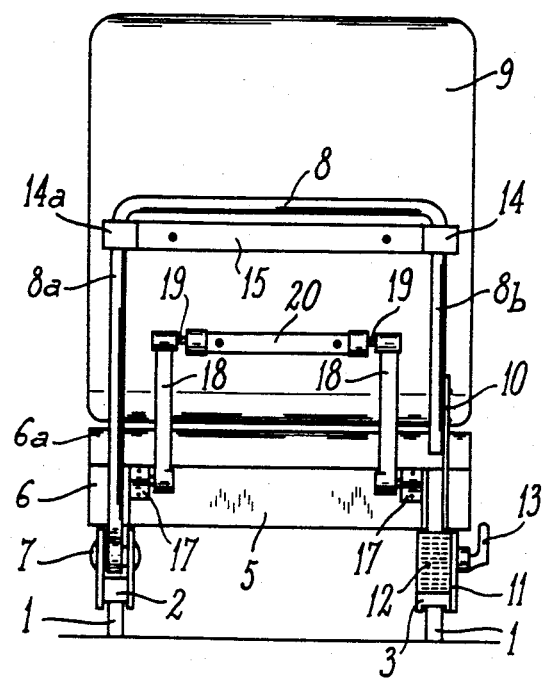
FIG. 2 is an elevation view along line II—II of FIG. 1.

In the normal position of use, the seat back 9 is upright, as is shown in FIGS. 1 to 3, and is locked in position by a lever 13. If one wishes to somewhat incline the seat backwards, the only thing to do is to press the lever 13, or to pull said lever according to the nature of the mechanism associated therewith, which allows pivoting the seat back and the stirrup legs about axis 7 so that the seat back be more inclined rearwardly.

The pivoting movement of the seat back to the rear can go on until the moment where said seat back occupies a horizontal position in which its outer face is in alignment with the top of seat 6, as is shown in FIG. 4.

During the pivoting movement of the seat back from the position shown in FIG. 1 to the position shown in FIG. 4, the seat back is kept at a constant distance from the articulations 17 of the connecting rods or cranks 18 since these are fixed to the seat back. Consequently, the distance from the articulations 17 to the bottom 9a of the seat back does not vary. On the other hand, the articulation of legs 8a, 8b being at a level which is substantially lower causes a displacement of the stirrup assembly 8 relative to the rear face of the seat back 9. Said displacement is a sliding movement and the guiding of the trajectory is provided by the guide-pieces 14, 14a.

At the end of the pivoting movement, the lever 13 allows locking again the seat back 9 in the position shown in FIG. 4, position in which the spring 12 is under a high stress.

In order to bring the seat back to the position shown in the other Figures, it is enough to operate again the lever 13 in order to allow the spring 12 to slacken, which causes the pivoting of stirrup 8 in the direction of arrow f by driving the seat back.

FIG. 5 illustrates another development of the invention according to which the cushion forming the seat itself as well as that forming the seat back 9 are made in a composite way. In fact, as can be seen in FIG. 5, on the lateral sides, longitudinal members 21, 22 made of a relatively solid garnishing material, for example a relatively high density foam which can be reinforced with fibers, an a median core 23 made of a substantially more flexible material, for example a low density foam. The assembly is covered by an envelope 24. Although this is not necessary, it is advantageous in all cases that the longitudinal members 21, 22 are formed with corners cut off 21a, 22a, the result being that the width of the core 23 is more important in the vicinity of the surface of the seat and of the back than in its lower portion.

In the above-explained embodiment, the seat cushioning offers a perfectly flat surface plane when the seat is not in use but has a tendency to deform to the configuration of the body of the user who sits on the seat. The user is thus supported as in a socalled bucket seat. Such a disposition also allows using the horizontal seat member itself and the seat back for forming comfortable berths when said berths are associated with cushions and when the users are lying transversely relative to the vehicle, particularly in the case of some leisure vehicles.

The invention is not limited to the embodiments shown and described in detail, and many modifications can be carried out without departing from its scope.

I claim:

1. A transformable seat comprising a horizontal seat member and a seat back, wherein the seat back is connected to the support of the seat member by an articulation linkage comprising means for maintaining the lower portion of said seat back in permanent contact with the top of the rear portion of the seat member and the rear end of the latter during the pivoting movement of the seat back from an upstanding position to a position in which the top surface of the seat back is aligned with the top of the seat member, wherein rod means for maintaining the seat back comprises connecting rods fixed to the seat back, said rod means having a free end which is articulated below the seat back and below the rear portion of the seat itself in a position which is substantially in alignment with the projection of the median plane of said seat back.

2. A transformable seat according to claim 1, wherein the seat back is connected to the support of the seat member by sliding elements and by a system of connecting rods.

3. A transformable seat according to claim 2, wherein sliding elements are formed of a stirrup, the legs of which are guided on the rear face of the seat back, one of said legs being articulated to a support beam and the other leg to a locking mechanism of the angular position of the stirrup.

4. A transformable seat according to either claim 1 or 2, wherein the connecting rod system maintaining the seat back comprises two cranks or connecting rods fixed to the seat back and the free end of which is articulated below the seat back and below the rear portion of the seat itself in a position which is substantially in alignment with the projection of the median plane of said seat back.

5. A transformable seat according to either claim 1 or 2, wherein the stirrup is connected to a spring mechanism tending to return it as well as the seat back which it guides to an upstanding position.

6. A transformable seat according to either claim 1 or 2, wherein the stirrup is guided at the rear of the seat back by a section forming at its ends two guide-pieces bearing against the legs of said stirrup.

7. A transformable seat according to either claim 1 or 2, characterized by flexible and antifriction material covering provided in the guide-pieces of the stirrup legs.

8. A transformable seat according to either claim 1 or 2, wherein the connecting rods are cranked and are connected, on the one hand, to a cross-beam placed below a projection prolongating the seat and, on the other hand, to the ends of a bar fixed at the rear portion of the seat back.

9. A transformable seat according to either claim 1 or 2, wherein the horizontal seat member as well as the seat back comprise a complex stuffing formed of longitudinal members which are more rigid than a median core which they surround.

10. A transformable seat according to claim 9, wherein the longitudinal members filling the seat member and the seat back are formed with cut out edges for imparting to the median core a variable flexibility.

* * * * *